United States Patent [19]

Genter

[11] 4,301,534
[45] Nov. 17, 1981

[54] FRAMING CIRCUIT FOR TIME MULTIPLEXED DATA

[75] Inventor: Roland E. Genter, Falls Church, Va.

[73] Assignee: Digital Switch Corporation, McLean, Va.

[21] Appl. No.: 28,361

[22] Filed: Apr. 9, 1979

[51] Int. Cl.³ .............................................. H04J 3/06
[52] U.S. Cl. ..................................... 370/105; 370/107
[58] Field of Search ........................ 370/105, 100, 107

[56] References Cited

U.S. PATENT DOCUMENTS

| | | | |
|---|---|---|---|
| 3,537,069 | 10/1970 | van de Houten | 370/100 |
| 3,576,947 | 5/1971 | Kruger | 370/105 |
| 3,603,735 | 9/1971 | Cleobury | 370/106 |
| 3,742,139 | 6/1973 | Boehly | 178/69.5 R |
| 3,854,011 | 12/1974 | Mallory | 179/15 BS |
| 3,883,929 | 5/1975 | de Cremiers | 370/100 |
| 4,002,845 | 1/1977 | Kaul | 179/15 BS |
| 4,004,100 | 1/1977 | Takimoto | 179/15 BS |
| 4,016,368 | 4/1977 | Apple | 179/15 BS |
| 4,060,797 | 11/1977 | Maxwell | 179/15 BS |

Primary Examiner—David L. Stewart
Attorney, Agent, or Firm—Cushman, Darby & Cushman

[57] ABSTRACT

A frame synchronization system for time division multiplexed data wherein all the time slots of the frame are considered during the course of the frame as opposed to being considered individually.

The framing system comprises a first memory, e.g., a random access memory (RAM), and a second memory, e.g., a programmable read-only memory (ROM). The RAM includes respective locations corresponding to each relative bit time slot in the framing interval. The ROM includes respective locations corresponding to each correlation state in a predetermined sequence of states, respectively indicative of the number sequential bits in a given time slot matching the synchronization pattern. Each word in the ROM contains, in a link field, indicia of the ROM locations corresponding to the next state in the sequence. The ROM word also contains indicia of whether or not a correlation state has been attained indicative of the frame sync bit. Each RAM location is sequentially addressed in synchronism with the data input stream. The RAM output is applied, together with the data train bit, to the address input of the ROM. The contents of the RAM location corresponding to the instantaneous bit time slot provides the base address, e.g., the most significant bits, and the data bit provides the least significant bit of the address of the ROM location to be accessed. The indicia in the addressed ROM locations corresponding to the next state in sequence is fed back as a data input to the RAM and loaded into the location corresponding to the instantaneous time slot. If the state associated with the addressed ROM location indicates sufficient correlation to the predetermined sync pattern, a pulse is generated on a frame sync line during the time slot to indicate the occurrence of the framing bit. Various correlation state sequences are also described.

9 Claims, 8 Drawing Figures

"F" SYNC PULSES

FRAMING CIRCUIT FOR TIME MULTIPLEXED DATA

BACKGROUND OF THE INVENTION

The present invention relates to frame synchronization and, in particular, a frame synchronization circuit for digital pulse code modulation (PCM) communication equipment.

In digital transmission systems, analog signals such as voice signals, are sampled and converted into a binary code word. The respective bits of code word are then serially transmitted to a receiver wherein the binary digits are recovered, and the code words reconstructed and decoded. The digital code words are then reconverted into an analog signal.

Digital transmission techniques facilitate the use of time division multiplexing to provide for transmission of data from many data channels over a single digital line. The digitized signals from the respective channels are combined serially in a periodic fashion. A typical example of a time division multiplexed PCM transmission system is that of the Bell Telephone system. A so-called "channel bank" receives a plurality of voice channels. The "channel bank" samples each channel in sequence and generates a digital code or byte representative of the sample on the digital line during relative bit time slots corresponding to that channel. Thus, the digital pulse stream comprises digitized signals from a plurality of channels serially combined in a periodic fashion. The periodic signal structure is often referred to as the line format, and one basic period of the signal is generally referred to as a frame. In other words, a signal frame comprises one digitized sample code word from each of the multiplexed channels. In typical applications, the channel bank encodes the samples into 8-bit binary code words for transmission over a 1.544 mega bits/second repeater line.

In demultiplexing the signal at the receiver, it is necessary to identify the beginning of the frame. A framing synchronization system is necessary to identify the various signal components and to bring the receiver into phase with the respective line formats so that the data bits can be properly assembled for decoding and demultiplexing. To identify the frame structure, an identifiable pulse sequence associated with the periodic format of the frame or some multiple of the frame format is inserted into the digital bit stream. The identifiable pulse sequence, hereinafter referred to as the framing characteristics or framing pattern, in effect, defines the frame length. Framing techniques typically utilize synchronization (sync) bits inserted in a predetermined bit time slot (relative bit position) within the frame, following a predetermined pattern. For example, the so-called T1 frame format consists of twenty-four 8-bit sample code words plus an additional sync bit.

The sync bit value pattern is predetermined in accordance with the type of interface equipment and method of encoding supervision data. One common T-carrier sync bit pattern utilizes only the sync bit in every second frame, and alternates the value (between 1 and 0) of such sync bits. The bits of the intervening frames are utilized for common channel signaling, channel bank alarms or for a multi-frame synchronization sequence for more complex encoding of supervision and alarm data. Framing synchronization is accomplished utilizing this pattern by recognizing the 1,0,1,0,1,0 ... pattern of the alternate frame sync bits. The framing interval is thus twice the frame length and the pairs of frames are, in effect, treated as a single superframe.

Another sync pattern commonly utilized on T1 lines repeats every twelve frames in the following sequence: 1,0,0,0,1,1,0,1,1,1,0,0. In addition, the sixth and twelfth frames are designated as containing "A-sync" and "B-sync" pulses. The A-sync and B-sync pulses are utilized in decoding supervision.

It is desirable that a framing synchronization system be relatively insensitive to line errors in the data stream and that the framing circuit be capable of rapidly establishing the framing sync bit or re-establishing identification of the sync bit after inadvertent loss of frame. Prior art framing systems have typically examined each relative bit time slot in a sequence manner. The framing pattern is verified by comparing the incoming data bits in a given bit position (time slot) over a number of frames with framing digits generated internal to the receiver. If the sync pattern of the time slot under examination is not the expected pulse sequence, the next time slot is searched. This searching scheme continues until a time slot is found containing the sync pattern. It must be appreciated, however, that such sequence framing synchronization techniques necessarily entail reframe times spanning a number of frames. Such a serial technique, in effect, involves searching through all possible bit time slots in order to locate the correct framing sequence.

Inadvertent loss of frame synchronization in the prior art is usually caused by line errors which temporarily alter the values of the sync bits and cause the receiver to declare itself out of frame, and requiring the framing circuit to re-establish frame synchronization. Such an unnecessary reframing (often referred to as a misframe) entails a loss of information during the reframing period.

For a more detailed description of digital transmission and frame synchronization techniques, reference is made to "Transmission Systems for Communications", Bell Telephone Laboratories, Western Electric Company, Inc., Technical Publications, Winston-Salem, North Carolina, 1970.

For further description of synchronization circuits and framing circuits, reference is made to the following U.S. Pat. Nos.: 3,581,010 (Kobayashi, 1971); 3,594,502 (Clark, 1971); 3,649,758 (Clark, 1972); 3,652,799 (Thomas, 1972); 3,662,114 (Clark, 1972); 3,678,200 (Clark, 1972); 3,699,261 (Tomozawa, 1972); 3,705,315 (Clark, 1972); 3,735,045 (Clark, 1973); 3,742,139 (Boehly et al, 1973); U.S. 3,754,102 (Clark, 1973); 3,770,897 (Haussmann et al, 1973); 3,792,201 (Osborne, 1974); 3,798,378 (Epstein, 1974); 3,854,011 (Mallory et al, 1974); 3,867,579 (Colton et al, 1975); 3,903,371 (Colton et al, 1975); 3,920,900 (Fineman, 1975); 3,985,967 (Colton et al, 1976); 3,988,674 (Sciulli, 1976); 4,002,845 (Kaul et al, 1977); 4,004,100 (Takimoto, 1977); 4,010,325 (Kline, 1977); 4,016,368 (Apple, Jr., 1977); 4,060,797 (Maxwell et al, 1977); and 4,121,057 (Luder, 1978).

SUMMARY OF THE INVENTION

The present invention provides a frame synchronization system that minimizes the time required for achieving frame synchronization and reframe time, is tolerant to line errors in the synchronization bits, is of relative simple structure, and is adaptable to nearly any synchronization pattern. The time required for achieving frame synchronization is minimized in that all bit time slots of a frame are examined for the defined synchronization pattern during the course of the frame.

The framing system comprises a first memory, e.g., random access memory, and a second memory e.g., a programmable read-only memory. The RAM includes respective locations corresponding to each relative bit time slot in the framing interval. The ROM includes respective locations corresponding to each correlation state in a predetermined sequence of states, respectively indicative of the number of sequential bits in a given time slot matching the synchronization pattern. Each word in the ROM contains, in a link field, indicia of the ROM locations corresponding to the next state in the sequence. The ROM word also contains a 1-bit frame sync signal flag field.

Each RAM location is sequentially addressed in synchronism with the data input stream. The RAM output is applied together with the data train bit to the address input of the ROM. The contents of the RAM in the location corresponding to the instantaneous bit time slot, provides the base address, e.g., most significant bits, and the data bit provides the least significant bit of the address of the ROM location to be accessed. The indicia in the addressed ROM locations corresponding to the next state in sequence is fed back as a data input to the RAM and loaded into the location corresponding to the instantaneous time slot. If the state associated with the addressed ROM location indicates sufficient correlation to the predetermined sync pattern, a one value is contained in the frame sync flag field, and is outputted on a frame sync line during the time slot to indicate the occurrence of the framing bit.

A frame synchronization circuit in accordance with the present invention is readily adaptable to virtually any synchronization pattern. In addition, additional frame sync flag fields can be provided to indicate respective sync bits such as the sync A and sync B bits.

BRIEF DESCRIPTION OF THE DRAWING

A preferred exemplary embodiment of the present invention will hereinafter be described in conjunction with the appended drawing wherein like numerals denote like elements, and.

DETAILED DESCRIPTION OF THE PREFERRED EXEMPLARY EMBODIMENT

Figure 1:
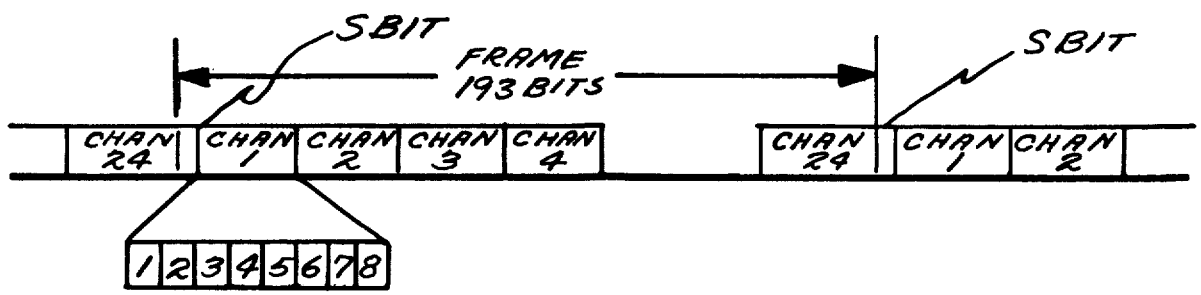
FIG. 1 is a graphic illustration of a typical T-carrier frame format.

As noted above, the typical T-carrier frame format consists of twenty-four 8-bit code words representative of samples from twenty-four channels (CHAN 1--CHAN 24) and a synchronization bit. The frame thus consists of 193 bit time slots. The sync (S) bit is suitably disposed as the first bit in the frame. A typical T-carrier frame format is illustrated schematically in FIG. 1.

The sync bits of the respective frames in the T1 carrier signal contains bit values in accordance with a predetermined synchronization pattern. For example, a synchronization pattern often used with T1 carriers is that wherein the value of the sync bit in every second frame alternates between a one and a zero. Pairs of frames, are, in effect, treated as a single frame, i.e., the framing is equal to twice the frame period, 386 bit intervals or time slots. The sync bit time slot of the intermediate frame is utilized for common channel signaling, channel bank alarms, or a multi-frame sync sequence for more complex encoding of supervision and alarm data.

Figure 2:
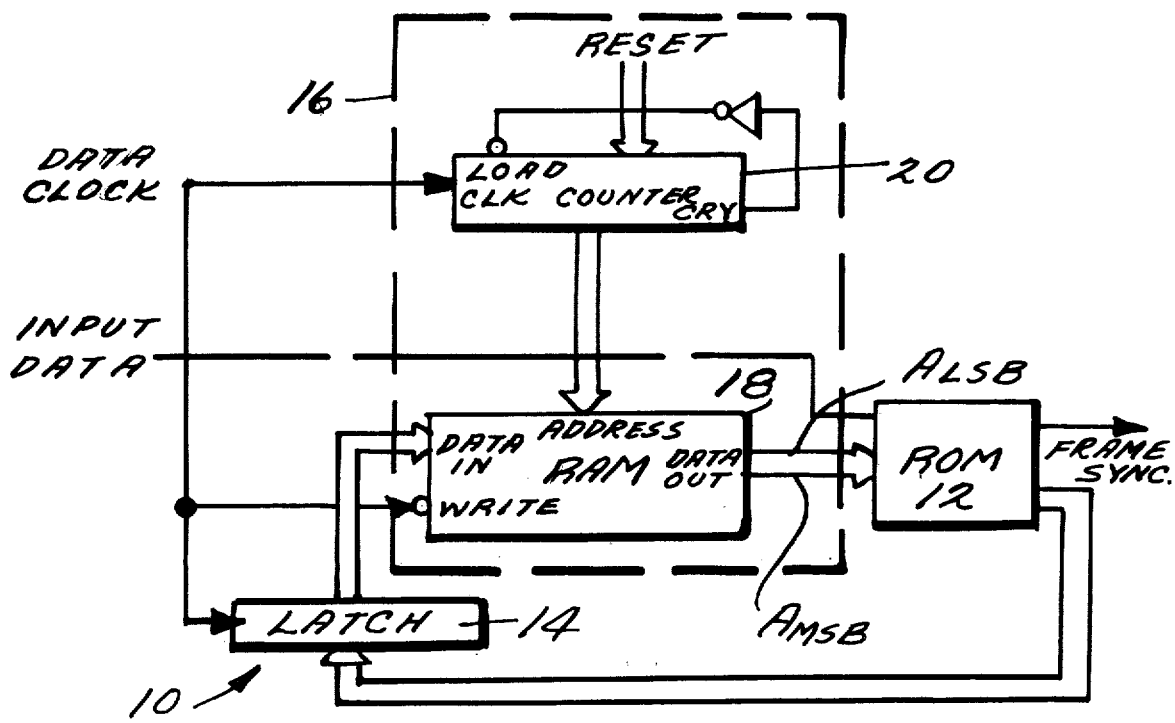
FIG. 2 is a block schematic diagram of one embodiment of a framing circuit in accordance with the present invention.

A framing circuit in accordance with the present invention suitable for detection of the alternate frame, alternate one, zero framing pattern, is shwon in FIG. 2.

Figure 3:
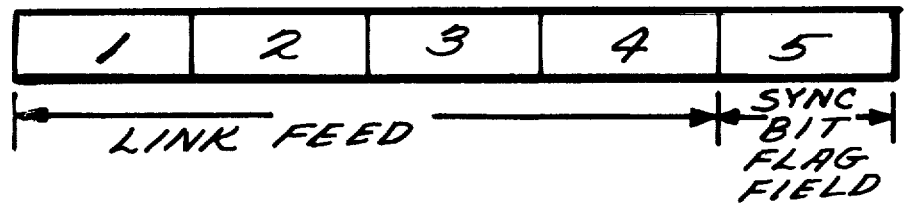
FIG. 3 is a diagrammatic representation of an exemplary ROM word format.

A first memory, suitably a read-only memory (ROM), is utilized to establish a desired correlation state sequence. The individual locations within the respective blocks are associated with respective data values in the next successive bit. ROM 12 includes a number of locations in accordance with the desired resolution of the system, as will be explained. The correlation state is indicative of how closely the previous history of the received bits in a given time slot correlates to the defined synchronization pattern. Respective blocks of locations in ROM 12 correspond to a respective correlation state in the sequence. Each location in ROM 12 contains a link field indicative of a base address of the ROM 12 locations corresponding to the next state in the sequence, and at least one frame bit flag indicative of whether the correlation state of the given time slot warrants designation as the sync bit. For a framing circuit 10 operating upon an alternate frame, 1,0,-type pattern, with 16-bit resolution, i.e., correlating the predetermined synchronization pattern with the data through sixteen frames, a thirty-two location ROM having five bits in each location is utilized. A suitable ROM word format is shown diagrammatically in FIG. 3.

The output signal of ROM 12 is indicative of the contents of an addressed word determined by address signals applied to address input lines A ($A_{MSB}$, $A_{LSB}$). The output line corresponding to the sync bit flag field provides a signal indicative of the occurrence of the sync bit, as will be explained. The ROM output lines corresponding to the link field, are applied through a suitable latch 14 to the data input of a suitable recirculating memory 16. Recirculating memory 16 having a number of memory locations at least equal to the synchronization bit interval, 512 locations in the present example. Recirculating memory 16 suitably comprises a random access memory (RAM) 18 and presettable counter 20. RAM 18 includes data input terminals, address terminals, a write control terminal and data output terminals. As is well known, the signals applied at the address terminals identify a particular location within the RAM. The data output signals are representative of the addressed location. In addition, in response to, for example, a negative going transition at the write control terminal, the addressed location within the RAM is loaded with indicia of the signals applied at the data input terminals. The parallel outputs of counter 20 are applied to the address input terminals of RAM 18.

Counter 20 is connected in a recirculating mode to cyclically address the respective locations (126-511) of RAM 18 in synchronism with the bit stream. Counter 20 is suitably a TTL counter which provides a carry output signal when an all "1" content is reached. A data clock signal indicative of the rate of the data stream, suitably providing a pulse indicative of each bit position or time slot in the data stream, is applied to the clock input of counter 20. The data clock signal is generated from the bit stream in accordance with conventional techniques. The carryover output signal of counter 20 is suitably fed back to the load input thereof to effect a periodic presetting of the counter. Counter 20 is suitably preset to a count of 126 to provide a count interval of 386 rendering the period of counter 20 equal to the sync bit interval.

The data clock is also applied as a control signal to latch 14, and to the write control terminal of RAM 18. The outputs of latch 14 are applied to the data input terminals of RAM 18.

The data output terminals of RAM 18 are respectively coupled to respective address input lines $A_{MSB}$ of ROM 12. Thus, the output of RAM 18 provides a portion of the address signals to ROM 12. The input data bit stream is applied to a further address input line $A_{LSB}$ of ROM 12. The output of RAM 18 designates what may be termed a base address indicative of the block of locations in ROM 12 corresponding to the correlation state of the instantaneous time slot. The input data bit occurring during the time slot provides a relative address, or least significant address bit to ROM 12 to designate the particular ROM 12 location within the block. In the present example, the base address provides the four most significant bits of the next correlation sequence ROM location. The correlation state of the previous history of the time slot is thereby defined, and the next input data bit occurring during that time slot defines the least significant bit of the address to particularly identify first or second locations in accordance with whether or not the bit value matches the sync pattern or not.

In operation, as each data bit is applied to framing circuit 10, the location of RAM 18 corresponding to that time slot is addressed. Accordingly, the output of RAM 18 identifies a base location in ROM 12. One of two locations corresponding to that base address is thus identified and addressed by the input data bit itself, i.e., in accordance with whether the bit is a "1" or a "0". ROM 12 will generate an output signal corresponding to the contents of the particular ROM location addressed. A frame sync pulse will be generated if appropriate, effectively in synchronism with the instantaneous time slot, and signals indicative of the base address of the ROM location corresponding to the next state in the sequence generated from the contents of the link field and latched by latch 14. Latch 14 is suitably responsive to positive levels in the data clock signal. Accordingly, upon the next successive negative going transition in the clock signal, the base address link from ROM 12 will be latched. Thereafter, upon the next negative going transition in the data clock, the inverted signal will cause a write control signal to be generated and the latched base address read into the addressed RAM location. Thus, the RAM location corresponding to a given time slot is loaded with the base address of the ROM locations corresponding to the next correlation state in the sequence and the next data bit in that time slot will define the least significant bit of a particular ROM location in the correlation state block.

In general, if the received data bit in the time slot matches the expected value of the defined synchronization pattern, the correlation state, i.e., base address, is incremented. If the data bit received during the time slot does not match the sync pattern, the base address is decremented by a predetermined number defined by the correlation sequence. When a predetermined state is attained by a time slot, a frame sync bit is generated during respective time slots for application to conventional frame decoding circuitry (not shown).

It should be appreciated that occasionally a data time slot will, due to the random nature of the data, coincidentally assume a correlation state for a short period of time high enough in the sequence to generate a frame sync pulse output in that time slot. To prevent the spurious frame pulse from interferring with frame decoding circuitry, conventional lock circuitry may be (not shown) interposed between framing circuit 10 and conventional frame decoding circuitry (not shown). The locking circuitry, in effect, recognizes only one frame sync pulse time slot. Similarly, conventional logic can be utilized so that only that time slot having the highest correlation state is recognized.

Figure 4:
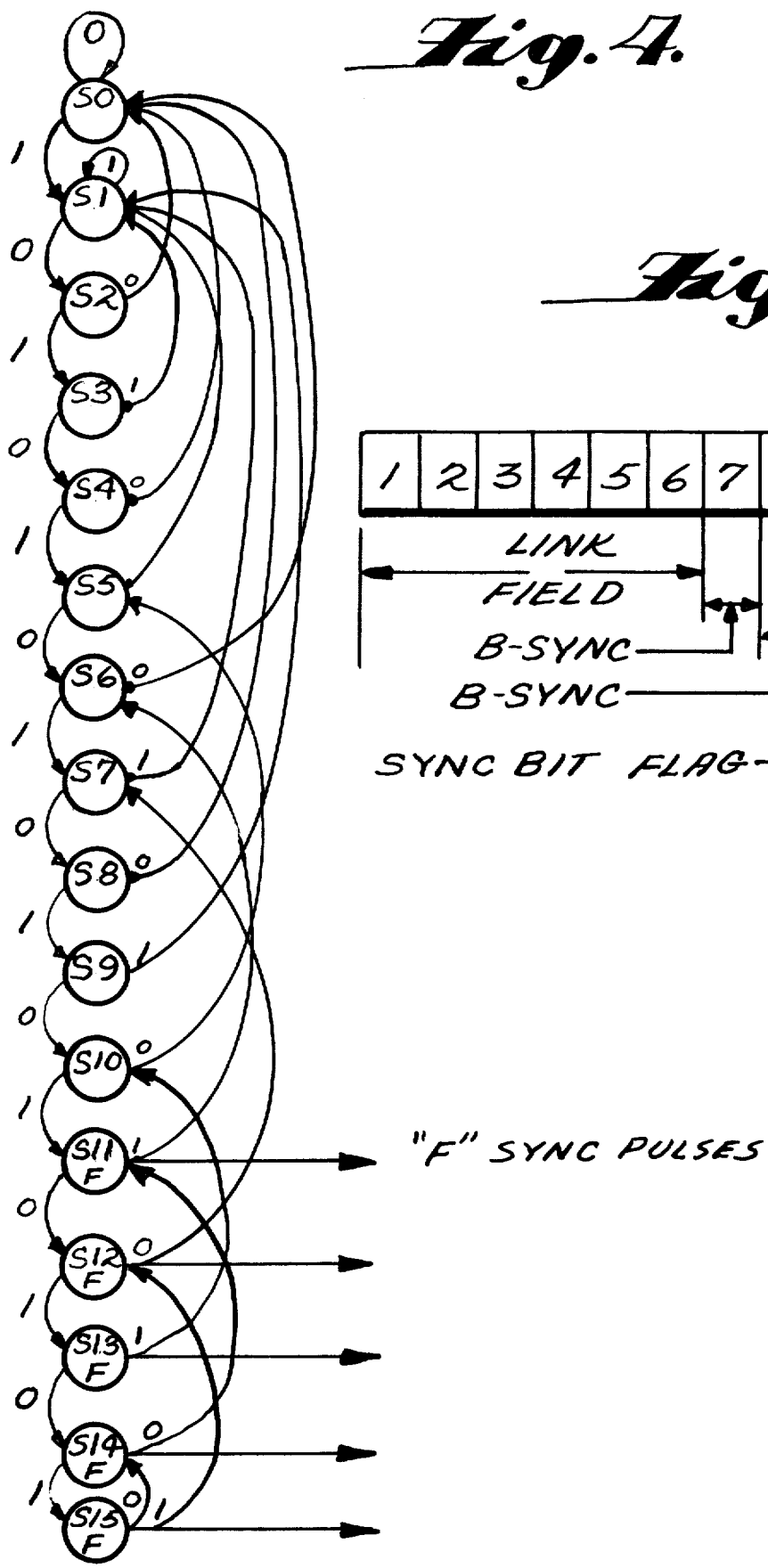
FIG. 4 is a state diagram of a suitable correlation state sequence.

A suitable correlation state sequence is shown in diagrammatic form in FIG. 4. The exemplary correlation state sequence provides for 16-bit correlation. In FIG. 4, the state number S0, S1 ... S15, in effect, indicates the decimal value of the base address associated with that state. The arrows originating at the state circle, indicate the link to the next state in the sequence in response to a "0" or "1" received bit in the time slot.

Once a given time slot reaches the twelfth state (S11) indicative of, in effect, twelve sequential bits corresponding to the predetermined synchronization pattern, the time slot is designated as the sync bit, and a "1" is stored in the sync bit flag field of the corresponding ROM 12 location. This is illustrated in the diagram of FIG. 4 by an "F" designation within the state circle.

The correlation state sequence depicted in FIG. 4 accounts for the possibility of line errors. The effect of a mismatch is, in effect, weighted in accordance with the statistical likelihood that the mismatch is due to a line error rather than actual misframing. Thus, if a mismatch occurs at any of the states S2, S4, S6 or S8, a link is provided back to the "0" state S0. Similarly, if a mismatch occurs in any of the states S1, S3, S5, S7 or S9, a link is provided to set the RAM address back to the "1" state S1. On the other hand, mismatches occurring in the higher correlation states generate links to correlation states higher in the sequence. For example, a mismatch occurring in a time slot in one of the higher correlation states, S10, S11, S12, S13, S14 and S15, effects a link to states S5, S6, S7, S10, S11 and S12, respectively.

It should be noted that the links effected in response to a mismatch are to a lesser state that provides an advancing correlation in response to the same data bit value (1 or 0) that would provide an advance in the next higher correlation state of the sequence. Mismatches from an odd state effect links to lesser odd states and mismatches in the event states, effect links to lesser even states. Thus, in the event that the mismatch was due to a line error, the next successive bit in the time slot, if correct, will cause an advance in the correlation state of the time slot.

To prevent the situation where framing circuit is, in effect, one sync bit out of phase with the sync pattern in the data, a mismatch in a time slot at state S0 effects a link back to that same state, to, in effect, alter the phase of the sequence by one frame so that a zero bit occurring in the next successive time slot will provide a match.

Where the full resolution of the system has been met, that is where a given time slot correlates through sixteen sync bits (16 frames) in an error-free environment, the state will oscillate between S14 and S15. It is noted that in the fourteenth and fifteenth states, line error will not throw the system out of frame synchronization, that is, the respective links from the fourteenth and fifteenth bits in the event of mismatches, are to states which in and of themselves, provide sync pulses.

The contents of ROM 12 corresponding to the correlation state sequence of FIG. 4 is shown in TABLE I:

TABLE I

| State | ROM Address | | ROM Content | |
|---|---|---|---|---|
| | RAM Content (ROM Base Addr) LSB | Data Bit (Relative Addr) | Link LSB | Sync Bit Flag |
| S0 | 0000 | 0 | 0000 | 0 |
| | | 1 | 1000 | 0 |
| S1 | 1000 | 0 | 0100 | 0 |
| | | 1 | 1000 | 0 |
| S2 | 0100 | 0 | 0000 | 0 |
| | | 1 | 1100 | 0 |
| S3 | 1100 | 0 | 0010 | 0 |
| | | 1 | 1000 | 0 |
| S4 | 0010 | 0 | 0000 | 0 |
| | | 1 | 1010 | 0 |
| S5 | 1010 | 0 | 0110 | 0 |
| | | 1 | 1000 | 0 |
| S6 | 0110 | 0 | 0000 | 0 |
| | | 1 | 1110 | 0 |
| . | . | . | . | . |
| . | . | . | . | . |
| S10 | 0101 | 0 | 1010 | 0 |
| | | 1 | 1101 | 0 |
| S11 | 1101 | 0 | 0011 | 1 (opt.) |
| . | . | . | . | . |
| S14 | 0111 | 0 | 1111 | 1 |
| | | 1 | 1101 | 1 |
| S15 | 1111 | 0 | 0011 | 1 |
| | | 1 | 0111 | 1 |

In operation, all of the RAM locations are initially set at "0". As each data bit time slot occurs, a corresponding location in RAM 18 is addressed, providing a base address indicative of the state "0". If the data bit is an "0", location "0" of ROM 12 is addressed, and a "0" state base address is written back into the same RAM location. Similarly, if the data bit is a "1", address 0,0,0,0,1 will be indicated at the address inputs to ROM 12, and a link will be provided to the base address of state "1", and so forth.

Figure 5:
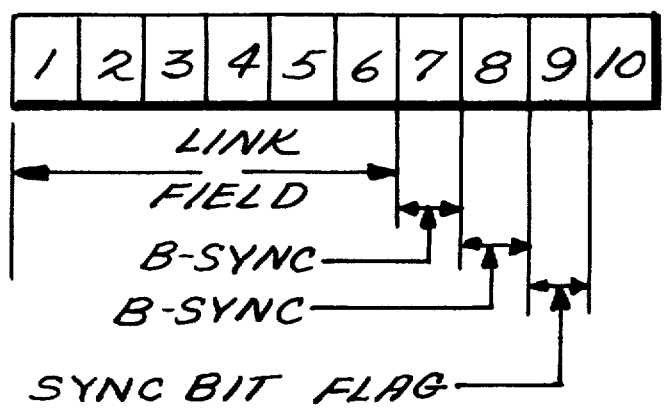
FIG. 5 is a diagrammatic representation of a second embodiment of a ROM word format in accordance with the present invention.

As previously noted, another common synchronization pattern utilized on T1 carrier channels, repeats every twelve frames in the following sequence: 1,0,0,0, 1,1,0,1,1,1,0,0. The sync pulses in the sixth and twelfth frames are denoted as the "A-sync" and "B-sync" pulses, respectively, and are utilized for decoding supervision. To accommodate such a synchronization pattern, a ROM 12 having 512 10-bit locations, is utilized. In fact, only nine bits are utilized in this particular embodiment, but conventional ROM chips generally utilize word lengths that are a multiple of two. FIG. 5 depicts, in schematic form, a suitable ROM 12 word format. The ROM word suitably includes a 6-bit link address field and respective 1-bit A-sync, B-sync and sync bit flag fields. The number of bits in latch 14, and the number of connections between ROM 12, latch 14 and RAM 18 would accordingly also be six in number.

The synchronization bit interval, is, in this case, only 193 bits. Accordingly, a RAM 18 having 256 6-bit words is utilized. Similarly, counter 20 is preset to the binary equivalent of decimal 63 and counts to the binary equivalent of 255 (whereupon the carry-over bit is generated to again preset the counter).

As before, counter 20, in effect, cyclically addresses each operative location in RAM 18 in synchronism with the data input bit stream. Thus, during each time slot, an associated 8-bit word from the corresponding location in RAM 18 is outputted as a base address signal to ROM 12. The particular ROM location within the block of locations identified by the base address is then identified by the input data bit in that time slot. The sequence linking of ROM 12 then, in effect, causes the state count (base address) to be incremented in response to a match, and decremented by a predetermined number in response to a mismatch in the data.

Figure 6:
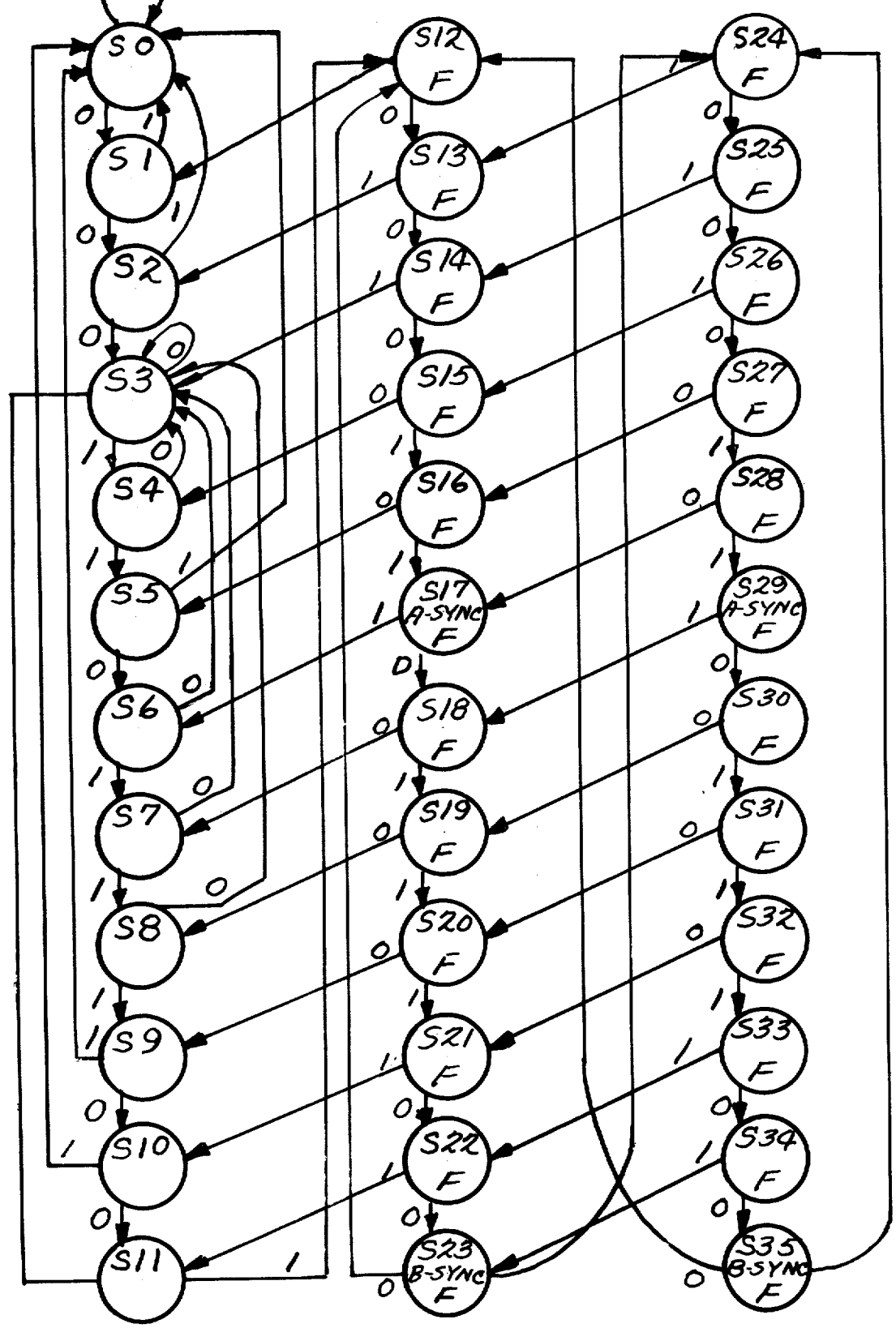
FIG. 6 is a state diagram of a suitable correlation state sequence for use with the ROM word format of FIG. 5.

FIG. 6 shows a suitable correlation state sequence for the twelve frame period synchronization pattern described above. As in FIG. 4, each state (S0-S35) is represented by a circle. Diagrammatic links to the next state in the sequence are determined by the value of the data bit in the time slot. The presence of a "F" designation within a state circle indicates the generation of a frame sync pulse by circuit 10 during the given time slot, i.e., the presence of a one in the frame sync bit flag field. Similarly, the presence of a designation "A-sync" or "B-sync" within a given state circle respectively designates the generation of an A-sync pulse or B-sync pulse during the time slot, i.e., a one value in the A-sync field or B-sync field of the ROM word corresponding to that state.

Figure 7:
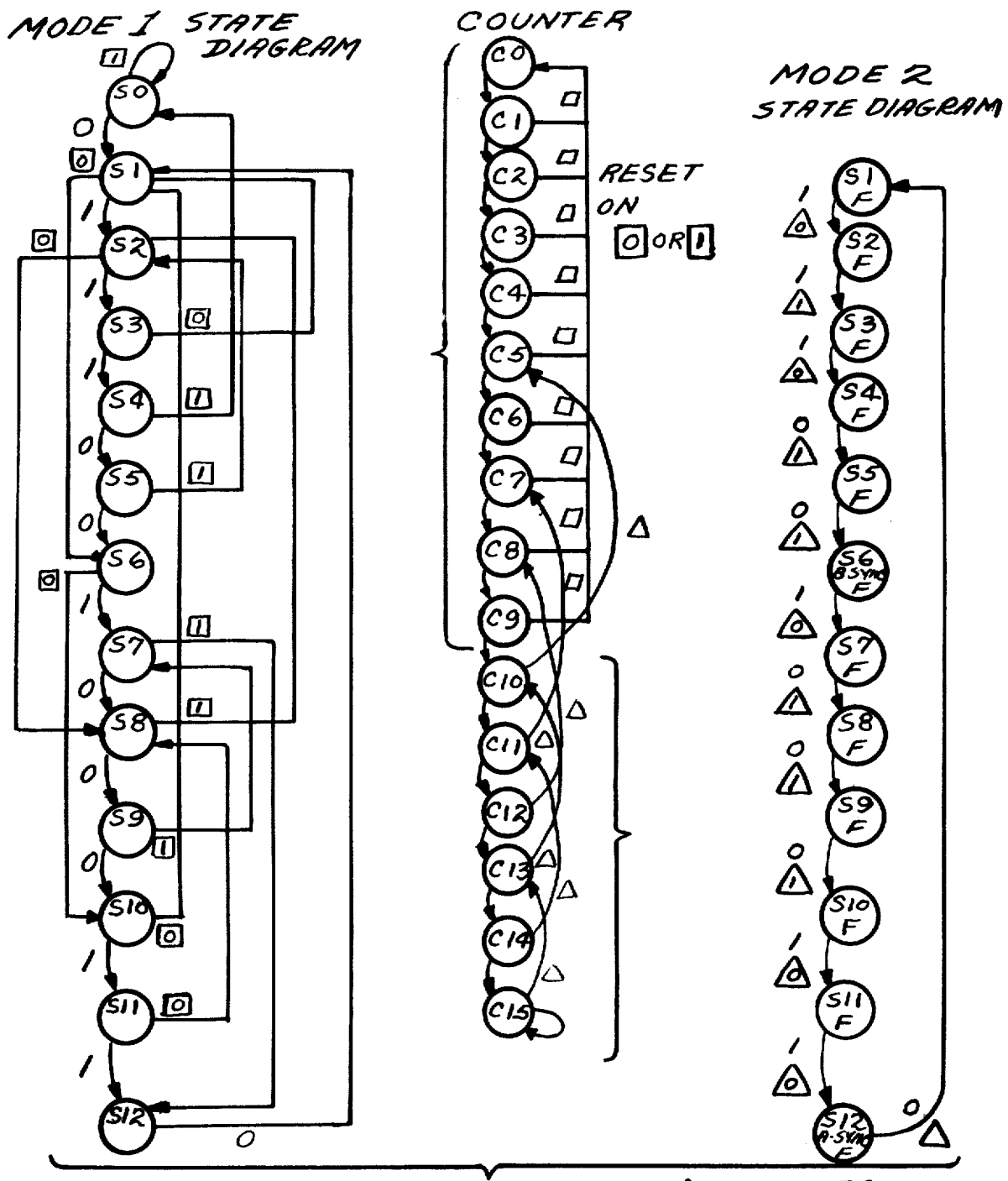
FIG. 7 is a state diagram of an alternate correlation state sequence.

FIG. 7 shows an alternative state diagram for use in conjunction with the above-described twelve frame period synchronization pattern. The correlation state diagram shown in FIG. 7 is particularly advantageous in that initial synchronization is accomplished in a minimum of time. In effect, the correlation sequence of FIG.

7 utilizes separate search mode (mode 1) and tracking mode (mode 2). The search mode (mode 1) provides a linking scheme which quickly brings the circuit 10 into synchronization with the framing pattern. The search mode (mode 1) correlation sequence, however, is relatively sensitive to line error. Accordingly, after a predetermined number of frame sync pulses have tracked the pattern, the tracking mode (mode 2) correlation sequence is adopted. The tracking mode (mode 2) correlation sequence is essentially insensitive to line error.

Figure 8:
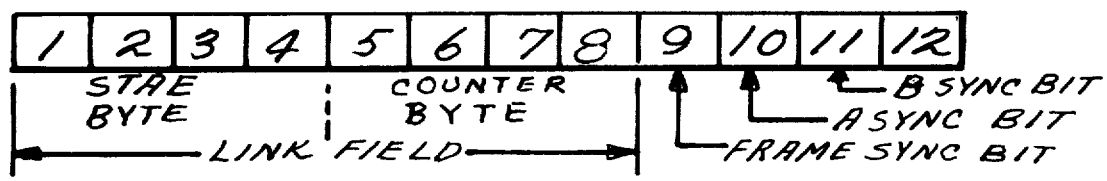
FIG. 8 is a diagrammatic representation of the ROM word format associated with the sequence of FIG. 7.

To accommodate the correlation sequence scheme depicted in FIG. 7, a ROM 12 having 512 12-bit locations, and an 8-bit latch is utilized. A 256 8-bit location RAM 18 and a counter 20 similar to that used in conjunction with the correlation state of sequence of FIG. 6 are also utilized. A suitable ROM 12 word format is depicted in diagrammatic form in FIG. 8.

The ROM word format includes an 8-bit link field and respective 1-bit frame sync flags, A-sync bit and B-sync bit fields. Additional flag fields or the like can, of course, be incorporated into the word. The link field is divided into a 4-bit state byte and a 4-bit counter byte. In essence, the contents of the state byte represents the instantaneous correlation state, and the contents of the counter represents the history of the time slot in attaining that state, i.e., the number of sequential bits following the correlation pattern without intervening deviations. In FIG. 7, each correlation state (S0-S12) and each counter state is represented by a circle having diagrammatic links to the next sequential correlation state or count effected in response to the data bit in the time slot. A box around the data bit designation for a given link (mode 1) in FiG. 7 indicates that the counter is reset to the zero state, C0. A triangle disposed about the bit designation for a given link (mode 2) indicates that the counter is penalized in accordance with the counter state chart of FIG. 7. As with respect to the correlation sequence of FIG. 6, an "F" designation, A-sync designation and B-sync designation indicates the generation of a framing sync pulse, A-sync pulse and B-sync pulse, respectively, during the instantaneous time slot.

As with respect to the previously described correlation sequences, the respective locations of RAM 18 are sequentially addressed in synchronism with the data input stream, and provide a base address to ROM 12, e.g., the eight most significant bits of a 9-bit address. The data bit in the associated time slot provides a relative address, e.g., the least significant bit of the address, to the ROM. The specified ROM location is thus accessed and output signals generated in accordance with the contents thereof. The link field from the addressed ROM location is fed back and written into the addressed RAM location to, in effect, update the correlation state record of the time slot.

The system initially operates with linking in accordance with the search mode (mode 1) correlation sequence. Both the correlation state and count are initially at zero. Each time the bit in a given time slot matches the synchronization pattern, the count in the counter byte is, in effect, incremented (through the linking), and the correlation state advanced in accordance with the linking system shown in the mode 1 state diagram of FIG. 7. The correlation sequence linking in the search mode (mode 1) is such that circuit 10 is most quickly brought into synchronization with the frame synchronization pattern, i.e., comes into phase with the pattern. Thus, situations where the synchronization pattern is first applied to circuit 10 at a point other than the beginning of the pattern are accommodated. It must be also appreciated, that all of the time slots in the digital signal are correlated against the bit pattern effect in parallel, as opposed to sequentially examining a single time slot until a deviation from the pattern is noted. Thus, the framing sync bit time slot is quickly acquired by circuit 10 in the search mode (mode 1).

After a predetermined number of sequential bits in a time slot have matched the pattern, circuit 10 assumes a tracking mode (mode 2) correlation sequence linking scheme with respect to that particular time slot. A framing bit indicia pulse is generated in each state in the tracking mode (mode 2) operation. The tracking mode sequence is essentially insensitive to bit line error, advancing the correlation state sequence irrespective of bit line error, but penalizing the count in the counter byte by a predetermined amount in accordance with the counter state diagram of FIG. 7. The amount of penalization is determined in accordance with the statistical likelihood of a deviation from the bit pattern being caused by a line error.

By way of example, assume that the data in the sync bit time slot follows the sequence depicted in Table II:

TABLE II

| Sync Pattern | Data in Time Slot | ←Address To ROM→ | | Addressed ROM Location Content | | | | |
|---|---|---|---|---|---|---|---|---|
| | | RAM Location Content | | | | | | |
| | | State | Count | State | Count | F | Sync A | Sync B |
| 0 | 0 | [0]0000 | [0]0000 | 1000[1] | 1000[1] | 0 | 0 | 0 |
| 1 | 1 | [1]1000 | [1]1000 | 0100[2] | 0100[2] | 0 | 0 | 0 |
| 0 | 0 | [2]0100 | [2]0100 | 0001[8] | 0000[0] | 0 | 0 | 0 |
| 0 | 0 | [8]0001 | [0]0000 | 1001[9] | 1000[1] | 0 | 0 | 0 |
| 0 | 0 | [9]1001 | [1]1000 | 0101[10] | 0100[2] | 0 | 0 | 0 |
| 1 | 1 | [10]0101 | [2]0100 | 1101[11] | 1100[3] | 0 | 0 | 0 |
| 1 | 1 | [11]1101 | [3]1100 | 0011[12] | 0010[4] | 0 | 0 | 0 |
| 0 | 0 | [12]0011 | [4]0010 | 1000[1] | 1010[5] | 0 | 0 | 0 |
| 1 | 1 | [1]1000 | [5]1010 | 0100[2] | 0110[6] | 0 | 0 | 0 |
| 1 | 1 | [2]0100 | [6]0110 | 1100[3] | 1110[7] | 0 | 0 | 0 |
| 1 | 1 | [3]1100 | [7]1110 | 0010[4] | 0001[8] | 0 | 0 | 0 |
| 0 | 0 | [4]0010 | [8]0001 | 1010[5] | 1001[9] | 0 | 0 | 0 |
| 0 | 0 | [5]1010 | [9]1001 | 0110[6] | 0101[10] | 1 | 0 | 1 |
| 1 | 1 | [6]0110 | [10]0101 | 1110[7] | 1101[11] | 1 | 0 | 0 |
| 0 | 0 | [7]1110 | [11]1101 | 0001[8] | 0011[12] | 1 | 0 | 0 |
| 0 | 0 | [8]0001 | [12]0011 | 1001[9] | 1011[13] | 1 | 0 | 0 |
| 0 | 0 | [9]1001 | [13]1011 | 0101[10] | 0111[14] | 1 | 0 | 0 |
| 1 | 1 | [10]0101 | [14]0111 | 1101[11] | 1111[15] | 1 | 0 | 0 |
| 1 | 1 | [11]1101 | [15]1111 | 0011[12] | 1111[15] | 1 | 1 | 0 |
| 0 | *1 | [12]0011 | [15]1111 | 1000[1] | 1011[13] | 1 | 0 | 0 |

TABLE II-continued

| Sync Pattern | Data in Time Slot | ←Address To ROM→ | | Addressed ROM Location Content | | | | |
|---|---|---|---|---|---|---|---|---|
| | | RAM Location Content | | | | | | |
| | | State | Count | State | Count | F | Sync A | Sync B |
| 1 | *0 | [1]1000 | [13]1011 | 0100[2] | 0101[10] | 1 | 0 | 0 |
| 1 | 1 | [2]0100 | [10]0101 | 1100[3] | 1101[11] | 1 | 0 | 0 |
| 1 | 1 | [3]1100 | [11]1101 | 0010[4] | 0011[12] | 1 | 0 | 0 |
| 0 | 0 | [4]0010 | [12]0011 | 1010[5] | 1011[13] | 1 | 0 | 0 |
| 0 | 0 | [5]1010 | [13]1011 | 0110[6] | 0111[14] | 1 | 0 | 1 |

*Line Error

TABLE II shows the contents of the location of RAM 18 associated with the sync bit time slot, together with the expected sync pattern. Indicia of the contents of the RAM location are applied, together with the data bit as an address signal to ROM 12. TABLE II also shows the content of the addressed location in ROM 12. For the readers convenience, the decimal equivalent of the binary numbers are also shown (in brackets [ ]). It should be noted that the leftmost bit of the binary numbers shown is the least significant bit.

In the example of TABLE II, the data is first applied to circuit 10 during a frame corresponding to the twelfth frame of the sync pattern. Accordingly, assuming no line error, when the first bit in the sync bit time slot is applied to circuit 10, the value will be zero. At that point, both the state and the count, i.e., the link field, contained in the RAM location corresponding to that time slot will also be zero. Accordingly, ROM location 0,0,0,0,0, will be addressed. The contents of that location contain a state byte content of one, and a count content of one, in accordance with the state diagram of FIG. 7. The link address field (state byte and counter byte) will be fed back and written into the RAM location corresponding to the sync bit time slot. Upon the next occurrence of the sync bit time slot, the RAM location will again be addressed and the contents thereof will be applied together with the data bit as the address signal to ROM 12. Assuming no line error, the data bit will follow the framing pattern and will have the value one. Accordingly, location 1,0,0,0,1,0,0,0, of ROM 12 will be addressed. The content of that ROM location is such that the state byte and count byte written back into the RAM location are each, in effect, incremented by one, i.e., state equals two and count equals two. Again, assuming no line error, the next data bit occurring in that time slot will be zero. The data bit, together with the content of the RAM (0,1,0,0,0,1,0,0, indicative of state equals two, count equals two) address a location in ROM 12 containing (in accordance with the correlation state searching mode sequence - mode 1) a link to state eight and an effective resetting of the count to zero. The state equals eight, count equal zero link would thus be written back into the RAM location as the base address for the next occurrence of the time slot. The next bit in that time slot should have a zero value. Accordingly, the ROM 12 location at the address generated by application of the RAM base address and data bit relative address (0,0,0,0,1,0,0,0,0) contains a link to the ROM locations with base address corresponding to state nine count one (1,0,0,1,1,0,0,0). Thus, both the state and count are again, in effect, incremented.

It should thus be seen that assuming no line errors, the successive bits received during the framing time slot will follow the framing pattern, the count will, in effect, be incremented in response to each of the in sequence bits and the state will follow the sequence shown in the mode 1 state diagram of FIG. 7. However, if a deviation occurs due to bit error, prior to the count attaining a certain threshold level (10), the counter byte will be reset to zero. For example, assuming that the base address stored in the RAM location indicated a state eleven, count three (1,1,0,1,1,1,0,0), and the data bit value received was zero, rather than a one in accordance with the synchronization pattern. The addressed location in ROM 12 (0,1,1,0,1,1,1,0,0) would contain a link address indicative of state eight and count zero (0,0,0,1,0,0,0,0).

When the count byte attains the threshold level of ten, the ROM location contains a flag bit in the framing sync byte flag field, to effect generation of the framing pulse, and the mode 2 tracking sequence linking is adopted. Accordingly, as shown in TABLE II, assuming the bit pattern to be followed without deviation through twelve frames, a count of ten will be attained and the linking will be such that the state is advanced irrespective of bit line errors, although the count will be penalized in response to bit line errors or deviations in accordance with the counter sequence shown in FIG. 7. For example, bit line errors are denoted in the exemplary data shown in TABLE II by asterisks*. In the example of TABLE II, in the seventh frame of the framing sequence, a line error causes a one to be received as data rather than the expected zero. The content of the RAM location at that point is indicative of state twelve, count fifteen (0,0,1,1,1,1,1,1). The ROM 12 location addressed (1,0,0,1,1,1,1,1,1) contains a linking field indicative of state one, count thirteen. Thus, the tracking mode sequence is followed from state twelve, back to state one, and the count byte penalized by two in accordance with the counter sequence. A frame pulse is, however, still generated in view of the statistical likelihood that the deviation from the pattern is due to a line error. Similarly, in the example of TABLE II, due to a line error, the bit in the sync bit time slot in the eighth frame is received as a zero rather than a one as expected. The ROM 12 location addressed by the RAM content and data contains a link field indicative of a state of two and count of ten. Thus, the tracking mode correlation state sequence is again followed and the count again penalized from thirteen to ten. Again, because of the statistical likelihood that the deviation was due to line error, a framing pulse is generated. If further errors occur, the count byte will ultimately drop below the threshold level of ten, and circuit 10 will, in effect, be thrown back into the mode 1 searching sequence.

It will be understood that the above description is of illustrative embodiments of the present invention, and that the invention is not limited to the specific form shown. For example, any desired correlation sequence or scheme can be utilized. Similarly, the ROM address can be derived from the data and RAM location content in manners other than the direct application thereof to the address input of the ROM. These and other modifications may be made in the design and arrangement of the elements without departing from the spirit of the invention as expressed in the appended claims.

What is claimed is:

1. A framing circuit for operation upon an input signal representing a train of sequential digital bits, said train of digital bits including sync bits at regular n-bit intervals, where n is an integer greater than one, said sync bits having values in accordance with a predetermined sync pattern, said framing circuit comprising:

first memory means, having a plurality of locations, and responsive to first memory means address signals applied thereto, for maintaining in said locations predetermined contents and generating first memory means output signals indicative of the contents of an addressed one of said first memory means locations in accordance with said first memory address signals, the predetermined contents of said memory location including indicia of first memory means locations corresponding to the next sequential state in a sequence of states representing relative correlation with said predetermined sync pattern, a portion of said first memory means output signal selectively providing indicia of the occurrence of said sync bits;

second memory means, having at least n locations and responsive to second memory means data signals and second memory means address signals applied thereto, for generating second memory means output signals indicative of the contents of an addressed second memory means location in accordance with said second memory means address signals and for controllably storing in said addressed second memory means location indicia of said second memory means data signals;

means for generating said second memory means address signals to cyclically address each of said second memory means locations in a predetermined sequence in synchronism with said sequential digital bits;

means, responsive to said second memory means output signals and said input signals representing said train of sequential digital bits, for generating therefrom said first memory means address signals; and means for applying at least a second portion of said first memory means output signal to said second memory means as second memory means data signal.

2. The framing circuit of claim 1 wherein:
said second memory means comprises a random access memory (RAM) having data input and address input terminals and data output terminals; and
said means for generating said second memory means address signals comprises a counter responsive to a signal indicative of the rate of said train of sequential digital bits and means for periodically presetting said counter.

3. The framing circuits of claim 1 or 2 wherein:
said first memory means comprises a read-only memory (ROM) having a plurality of address input lines and a plurality of output lines;
said ROM output lines producing signals indicative of associated bits in an addressed location within said ROM in accordance with signals applied to said address lines, one of said ROM output lines providing said indicia of the occurrence of said sync bit; and
said means for generating said first memory means address signals comprises means for applying said input train of sequential digital bits to one of said ROM address input lines and for applying said second memory means output signals to others of said ROM address input lines.

4. The framing circuit of claim 1 wherein:
said second memory means comprises a random access memory (RAM) having data input and address input terminals and data output terminals;
said means for generating said second memory means address signals comprises a counter responsive to a signal indicative of the rate of said train of sequential digital bits and means for periodically presetting said counter;
said first memory means comprises a read-only memory (ROM) having a plurality of address input lines and a plurality of output lines;
said ROM output lines producing signals indicative of associated bits in an addressed location within said ROM in accordance with signals applied to said address lines, one of said ROM output lines providing said indicia of the occurrence of said sync bit; and
said means for generating said first memory means address signals comprises means for applying said input train of sequential digital bits to one of said ROM address input lines and for applying said second memory means output signals to others of said ROM address input lines;
and wherein said first memory means further comprises a latch circuit receptive of at least a portion of said ROM output signals and responsive to said signal indicative of the rate of said train of sequential digital bits, said RAM right control input being responsive to a delayed signal indicative of said rate.

5. The framing circuit of claim 1 wherein:
said second memory means comprises a random access memory (RAM) having data input and address input terminals and data output terminals;
said means for generating said second memory means address signals comprises a counter responsive to a signal indicative of the bit rate of said multiplexed input signal and means for periodically presetting said counter;
said first memory means comprises a read-only memory (ROM) having a plurality of address input lines and a plurality of output lines;
said ROM output lines producing signals indicative of associated bits in an addressed location within said ROM in accordance with signals applied to said address lines, one of said ROM output lines providing said indicia of the occurrence of said sync bit;
said means for generating said first memory means address signals comprises means for applying said input train of sequential digital bits to one of said ROM address input lines and for applying said second memory means output signals to others of said ROM address input lines; and
wherein said update means further comprises a latch circuit receptive of at least a portion of said ROM output signals and responsive to said signals indicative of said rate of said train of sequential digital bits, said RAM right control input being responsive to a delayed signal indicative of said rate.

6. A framing circuit for operation upon a time division multiplexed input signal comprising a plurality of digital signals serially combined in a periodic fashion, whereby the data bits of said digital signals occur during respective periodic time slots, said multiplexed signal further including a sync bit in one of said time slots, said sync bit value following a predetermined sync pattern, said framing circuit comprising:

a first memory having a plurality of locations, respective blocks of locations corresponding to respective correlation states each having an associated address, each of said first memory locations including indicia of the block of first memory locations corresponding to the next correlation state in said sequence, and further including indicia of whether the associated correlation state is such as would indicate detection of the sync pattern;

a second memory including a number of locations at least equal to the number of time slots in a period of said multiplexed input signal, each of said second memory locations being associated with a respective particular time slot;

means for cyclically addressing said second memory locations in synchronism with said associated time slot;

means, responsive to signals indicative of the addressed second memory location and said multiplexed input signal for addressing a particular first memory location within the block of locations corresponding to the correlation state of the time slot associated with said second memory means locations and means for applying said indicia of the block of first memory locations corresponding to the next sequential correlation state contained in said particular addressed first memory location to said second memory and storing said indicia in said addressed second memory location.

7. A framing circuit for operation upon a time division multiplexed input signal comprising a plurality of digital signals serially combined in a periodic fashion, whereby the data bits of said digital signals occur during respective periodic time slots, said multiplexed signal further including a sync bit in one of said time slots, said sync bit value following a predetermined sync pattern, said framing circuit comprising:

means for storing respective correlation counts, each associated with a respective time slot, indicative of the correlation between the value of the bits occurring during said associated time slot and said predetermined sync pattern, and selectively generating a correlation state signal indicative of the correlation of each respective time slot during the occurrence of the respective time slots;

update means, responsive to said correlation state signal, and said multiplexed input signal, for updating each said correlation count in response to data bits occurring during the respective associated time slots, whereby each correlation count is updated during each period of said multiplexed input signal; and means, cooperating with said update means, for generating an indicia signal during a respective time slot when the correlation count associated with said respective time slot attains a predetermined threshold value;

said update means comprising:

first memory means, having a plurality of locations and responsive to first memory means address signals applied thereto, for maintaining in said locations predetermined contents and generating first memory means output signals indicative of the contents of an addressed one of said first memory means locations in accordance with said first memory means address signals, the predetermined contents of said memory location including indicia of the first memory means locations corresponding to the next sequential correlation count in a predetermined sequence of correlation counts, and further including indicia of whether the instantaneous correlation state has attained said predetermined threshold level;

said means for storing comprising:

second memory means, having a plurality of locations at least equal to the number of time slots in a period of said multiplexed input signals, and responsive to second memory means data signals and second memory means address signals applied thereto, for generating said correlation state signals in accordance with the contents of an addressed second memory means location as determined by said second memory means address signals, and for controllably storing in said addressed second memory means location indicia of said second memory means data signals; and means for generating said second memory means address signals to cyclically address each of said second memory means locations in a predetermined sequence in synchronism with said multiplexed input signal time slots; said update means further comprising:

means, responsive to said correlation state signal and said multiplexed input signal, for generating therefrom said first memory means address signals; and means for applying said indicia of the first memory means locations corresponding to the next sequential count to said second memory means as said second memory means data signal.

8. The framing circuit of claim 7 wherein:

said second memory means comprises a random access memory (RAM) having data input and address input terminals and data output terminals; and said means for generating said second memory means address signals comprises a counter responsive to a signal indicative of the bit rate of said multiplexed input signals and means for periodically presetting said counter.

9. The framing circuits of claims 8 or 7 wherein:

said first memory means comprises a read-only memory (ROM) having a plurality of address input lines and a plurality of output lines;

said ROM output lines producing signals indicative of associated bits in an addressed location within said ROM in accordance with signals applied to said address lines, one of said ROM output lines providing said indicia of the occurrence of said sync bit; and said means for generating said first memory means address signals comprises means for applying said input train of sequential digital bits to one of said ROM address input lines and for applying said second memory means output signals to others of said ROM address input lines.

* * * * *